(12) United States Patent
Mukul et al.

(10) Patent No.: US 11,409,548 B2
(45) Date of Patent: Aug. 9, 2022

(54) KEYPRESS EVENT SMOOTHENER AND PREDICTOR

(71) Applicant: Adobe Inc., San Jose, CA (US)

(72) Inventors: Reetesh Mukul, Bangalore (IN); Mayuri Jain, Bangalore (IN)

(73) Assignee: Adobe Inc., San Jose, CA (US)

( * ) Notice: Subject to any disclaimer, the term of this patent is extended or adjusted under 35 U.S.C. 154(b) by 2 days.

(21) Appl. No.: 17/075,804

(22) Filed: Oct. 21, 2020

(65) Prior Publication Data

US 2022/0121459 A1    Apr. 21, 2022

(51) Int. Cl.
| | |
|---|---|
| *G06F 9/451* | (2018.01) |
| *G06F 9/54* | (2006.01) |
| *G06F 3/023* | (2006.01) |
| *G06F 3/04883* | (2022.01) |
| *G06F 3/04886* | (2022.01) |

(52) U.S. Cl.
CPC ............ *G06F 9/451* (2018.02); *G06F 3/0237* (2013.01); *G06F 3/04883* (2013.01); *G06F 3/04886* (2013.01); *G06F 9/542* (2013.01)

(58) Field of Classification Search
CPC ........ G06F 9/451; G06F 9/542; G06F 3/0237; G06F 3/04883; G06F 3/04886
See application file for complete search history.

(56) References Cited

U.S. PATENT DOCUMENTS

2021/0089138 A1 *    3/2021   Imms .................. H04L 67/2847

* cited by examiner

*Primary Examiner* — Andrey Belousov
(74) *Attorney, Agent, or Firm* — Kilpatrick Townsend & Stockton LLP (57) ABSTRACT

In some embodiments, a key smoothener and predictor module of a software application executing on a computing device receives a sequence of key events from an input device of the computing device and through a user interface of the software application. The key smoothener and predictor module stores the sequence of key events in a key event queue and predicts the total number of key events for processing in a current processing cycle of the application based on the sequence of key events. A processing component of the software application processes an aggregated key event that indicates multiple keypresses. The number of the multiple keypresses is the same as the predicted total number of key events for the current processing cycle. The software application further causes the user interface of the software application to be updated based on processing the aggregated key event.

20 Claims, 7 Drawing Sheets

| TIME INTERVAL | TIMES | WITHOUT KEY SMOOTHENING AND PREDICTION | WITH KEY SMOOTHENING AND PREDICTION | IMPROVEMENT |
|---|---|---|---|---|
| 0.1 | 25 | 201 | 1753 | 8.72 |
| 0.1 | 25 | 201 | 1546 | 7.69 |
| 0.1 | 25 | 201 | 1753 | 8.72 |
| 0.1 | 25 | 201 | 1625 | 8.08 |
| 0.1 | 25 | 201 | 1649 | 8.20 |
| 0.2 | 25 | 201 | 2393 | 11.91 |
| 0.2 | 25 | 201 | 2377 | 11.83 |
| 0.2 | 25 | 201 | 2409 | 11.99 |
| 0.4 | 25 | 201 | 1201 | 5.98 |
| 0.4 | 25 | 201 | 1201 | 5.98 |
| 0.4 | 25 | 201 | 1193 | 5.94 |
| 0.6 | 25 | 201 | 769 | 3.83 |
| 0.6 | 25 | 201 | 769 | 3.83 |
| 0.6 | 25 | 201 | 769 | 3.83 |
| 0.8 | 25 | 201 | 569 | 2.83 |
| 0.8 | 25 | 201 | 577 | 2.87 |
| 0.8 | 25 | 201 | 577 | 2.87 |
| 1 | 25 | 201 | 393 | 1.96 |
| 1 | 25 | 201 | 401 | 2.00 |
| 1 | 25 | 201 | 401 | 2.00 |
| 1.25 | 25 | 201 | 201 | 1.00 |
| 1.25 | 25 | 201 | 201 | 1.00 |
| 1.25 | 25 | 201 | 201 | 1.00 |
| 1.5 | 25 | 201 | 201 | 1.00 |
| 1.5 | 25 | 201 | 201 | 1.00 |
| 1.5 | 25 | 201 | 201 | 1.00 |

KEYPRESS EVENT SMOOTHENER AND PREDICTOR

TECHNICAL FIELD

This disclosure relates generally to computer-implemented methods and systems for keypress events processing. Specifically, the present disclosure involves smoothing and predicting keypress events for an improved response speed by a software application.

BACKGROUND

Many software applications allow users to use different input devices, such as keyboards or other key-based input devices, to facilitate user interaction with the applications. However, existing applications do not manage how the input device and the corresponding processing component are interacting. Instead, these applications mainly rely on the operating system to provide keypress events to the processing component as the keypresses are received from the user. As a result, these applications often fail to respond in time when the keypress inputs are provided continuously at irregular and short time intervals. The failure of responding to the keypresses in time may lead to further delays and, sometimes, even application crashes and hangs.

SUMMARY

Certain embodiments involve smoothing and predicting keypress events for a software application. In one example, a software application executing on a computing device includes a key smoothener and predictor module. The key smoothener and predictor module receives a sequence of key events from an input device of the computing device through a user interface of the software application. The key smoothener and predictor module stores the sequence of key events in a key event queue and predicts the total number of key events for processing in the current processing cycle of the application. The prediction is performed using the sequence of key events in the key event queue. The key smoothener and predictor module further generates an aggregated key event by aggregating the predicted number of key events. The aggregated key event is sent to a processing component of the software application that is configured to process the aggregated key event. The software application further updates the user interface of the software application based on processing the aggregated key event.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

The present disclosure involves smoothening and predicting keypress events for a software application. As discussed above, existing software applications, due to lack of management of the interaction between the input device and the corresponding processing component, often incur delays in responding to keypress events when continuous keypresses are received within a short period of time. Certain embodiments described herein address these limitations by smoothening and predicting keypress events for a software application. For instance, a key smoothener and predictor module in a software manipulation application receives, and stores in a key event queue, keypress events (or "key events" in short) directed to the software application. These key events are received from the operating system of the computing device executing the software application. For each processing cycle of the processing component of the software application that is configured to process the key events, the key smoothener and predictor module estimates the number of key events to be processed by the processing component. The key smoothener and predictor module further aggregates these key events into an aggregated key event. The key smoothener and predictor module sends the aggregated key event to the processing component for processing in the current processing cycle.

The following non-limiting example is provided to introduce certain embodiments. In this example, a software application is configured to generate a user interface and have the user interface presented on a display device. The software application further includes a processing component that is associated with the user interface and configured for processing the user input received through the user interface. The user interface allows a user of the software application to interact with the software application through a key-based input device, such as a keyboard. When a user operates the key-based input device, the software application receives key events and directs the received key events to a key smoothener and predictor module for processing instead of sending them directly to the processing component associated with the user interface.

The key smoothener and predictor module stores the received key events in a key event queue as they are received. The key smoothener and predictor module further determines the processing cycle of the processing component. At the beginning of each processing cycle, the key smoothener and predictor module estimates the total number of key events to be processed by the processing component for the current processing cycle. In some examples, the number of events can include the events received during the previous processing cycle (i.e., during the time period when the processing component was processing the key events for the last processing cycle). These key events are aggregated into a single aggregated event and sent to the processing component for processing. This method may, however, cause delay in responding to the keypresses, especially for those key events received near the beginning of the last processing cycle.

In other examples, the key smoothener and predictor module estimates the number of key events for the current processing cycle by including the key events in two time windows. The first time window includes a portion of the last processing cycle and covers the time period immediately preceding the current time (i.e., the beginning of the current processing cycle). The second time window is a future time window and covers a portion of the upcoming processing cycle (e.g., from the current time to a future time point of the current processing cycle). In this way, the largest delay in processing the key event is less than the processing cycle therefore providing a better response speed than the method discussed above. In certain implementations, the first time window is determined by the receiving time of the key events in the key event queue. For example, the first time window starts from the time of the oldest event in the key event queue and ends at the current time. The second time window is determined using the time of the key events in the key event queue and a Weibull distribution. The number of events in the first time window is determined by the key events in the key event queue. The number of events in the second time window is estimated by utilizing the Weibull distribution.

The key smoothener and predictor module aggregates the key events estimated for the current processing cycle into a single aggregated event. The aggregated key event indicates the total number of keypresses included in those key events. The key smoothener and predictor module sends the aggregated key event, rather than the individual key events, to the processing component for processing. As a result, the processing component processes the multiple keypresses together which is typically faster than separately processing the individual key events. For example, a document review application (e.g., Acrobat Reader® developed by Adobe Inc. at Mountain View, Calif., U.S.) is configured to respond to a down keypress by displaying the next page of the document. If the application receives seven individual key events in a row, it will display the seven pages at a regular speed. If the application receives an aggregated key event indicating a total of seven keypresses, the application will display the seven pages at a faster speed and stop at the seventh page. Further, depending on the type of application, responding to a key event may include loading and unloading files, such as documents, images, and so on. By aggregating multiple key events into one aggregated event, the application can save the time and resources for loading and unloading the files between consecutive keypresses.

As described herein, certain embodiments provide improvements to the software applications by increasing the speed of response to keypresses thereby improving the overall performance of the software application. As discussed above, by aggregating multiple key events into an aggregated key event for processing, the time and resources, such as CPU times and memory spaces, required for processing these key events can be reduced. This also increases the stability of the software application because other components or processes of the software applications will not be interfered with by the processing delay caused by the large amount of key events in a short period of time. In addition, predicting and aggregating future events for the current processing cycle further reduces the delay in processing the key events and increases the response speed of the software application.

As used herein, a keypress event refers to an event signaling that a key (either character key or a non-character key) on the key-based input device is activated once which does not necessarily involve releasing the key. For example, a keypress event may be generated when a user presses the key and immediately releases the key. Keypress events may also be generated when a user presses the key and hold it for a period of time. In this case, multiple keypress events, instead of one, are generated because the key is activated multiple times even though the user does not release the key during this period of time.

Example Operating Environment for Key Events Smoothening and Prediction

Figure 1:
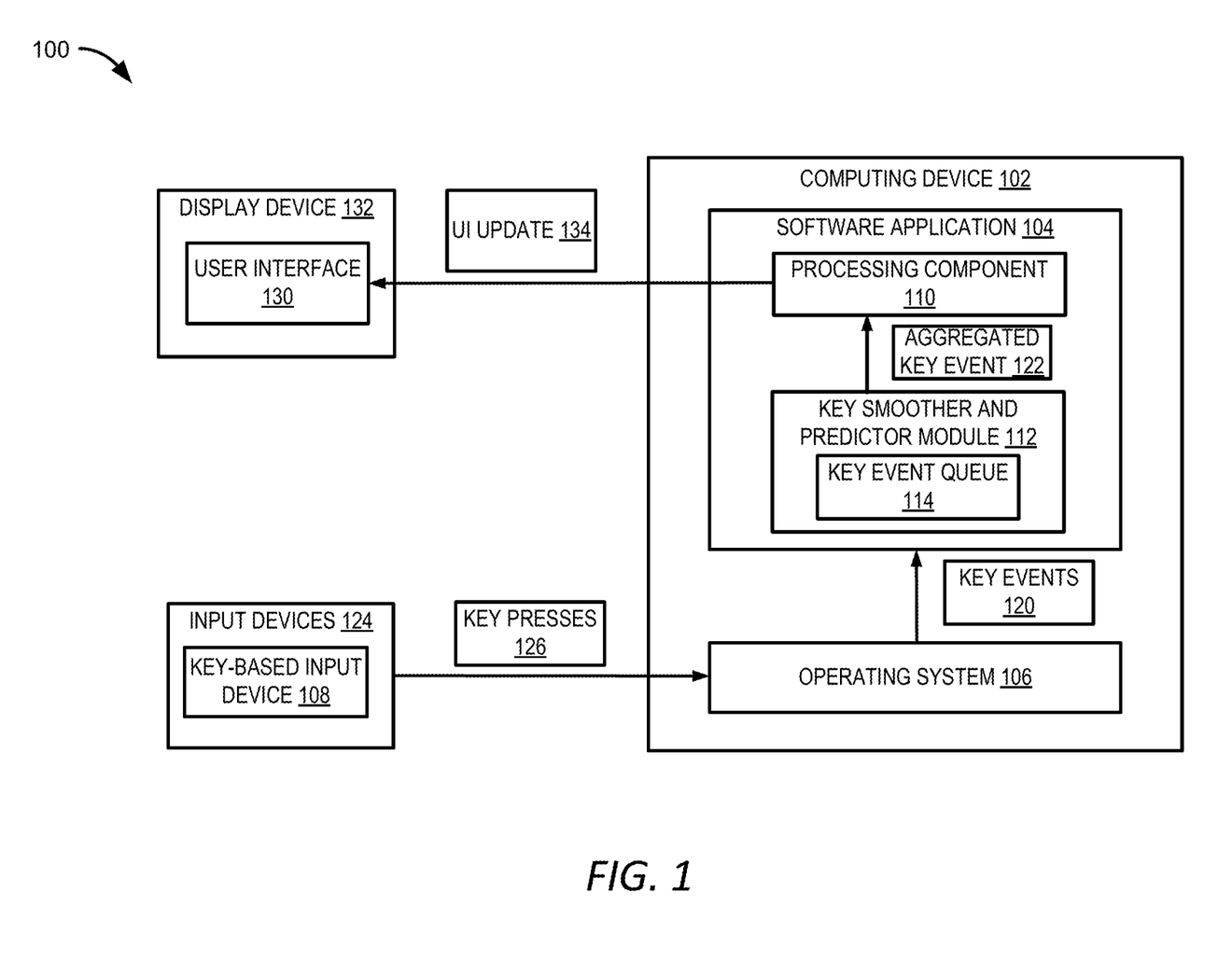
FIG. 1 depicts an example of a computing environment for smoothening and predicting keypress events for a software application, according to certain aspects of the present disclosure.

Referring now to the drawings, FIG. 1 depicts an example of a computing environment 100 for smoothening and predicting keypress events for a software application, according to certain aspects of the present disclosure. The computing environment 100 includes a computing device 102 that executes a software application 104, an input device 124 for providing user inputs to the software application 104, and a display device 132 for displaying a user interface 130 of the software application 104 that allows a user to interact with the software application 104 via the input device 124.

The software application 104 includes a processing component 110 configured for processing inputs received through the user interface 130. The processing component 110 or another component of the software application 104 is configured for generating the user interface 130 and updating the user interface 130 based on the processing results. The software application 104 further includes a key smoothener and predictor module 112 configured for processing and managing the key events 120 prior to sending the key events 120 to the processing component 110. In some examples, the key smoothener and predictor module 112 is implemented as a library and the software application 104 includes the key smoothener and predictor module 112 for the processing component by calling the library.

The operating system 106 of the computing device 102 detects the keypresses from an input device 124 that is operated by a user over the user interface 130 associated with the processing component 110. Examples of an input device 124 include a key-based input device 108, such as a keyboard, a remote control, a device controller, etc. In response to detecting the keypresses, the operating system 106 generates key events 120 for respective keypresses and determines that the software application 104, as the active application when the keypresses were received, is the destination application of the key events 120. The operating system 106 sends the generated key events 120 to the software application 104 as they are detected.

The software application 104 directs the key events 120 received from the operating system 106 to the key smoothener and predictor module 112. In some examples, the key smoothener and predictor module 112 stores the received key events 120 into a key event queue 114. The key smoothener and predictor module 112 processes the key events 120 according to a processing cycle $\vartheta$ of the processing component 110. The length of the processing cycle $\vartheta$ depends on various factors, such as the processing time of a key event by the processing component 110, the user interface update rate agreeable to the user, and so on. In other words, if the processing time of a key event is longer, then the processing cycle $\vartheta$ is longer; if the user interface update rate is high, then the processing cycle $\vartheta$ is determined to be short. In some implementations, the processing cycle $\vartheta$ is set to be no less the processing time of a key event by the processing component 110.

The key smoothener and predictor module 112 queues the key events 120 received during a previous processing cycle and at the beginning of the current processing cycle, the key smoothener and predictor module 112 generates an aggregated key event 122 for the processing component 110 to process. The key smoothener and predictor module 112 triggers the processing component 110 to process the key events 120 by sending the aggregated key event 122 (instead of the individual key events 120) to the processing component 110. The key smoothener and predictor module 112 determines the aggregated key event 122 by calculating the number of key events 120 received and to be received for the current processing cycle $\vartheta$.

In some examples, the number of key events is calculated to include the key events 120 received during the previous processing cycle (i.e., during the time period when the processing component 110 was processing the key events for the previous processing cycle). These key events 120 are aggregated into a single aggregated event 122 and sent to the processing component 110 for processing. In these examples, some key events, especially the key events received near the beginning of the last processing cycle, are processed with a delay close to the length of the processing cycle $\vartheta$.

In other examples, the key smoothener and predictor module 112 estimates the number of key events for the current processing cycle $\vartheta$ by including the key events in two time windows. The first time window, denoted as $\theta_1$, and is taken from the previous processing cycle and covers the time period immediately preceding the current time (i.e., the beginning of the current processing cycle). The second time window, denoted as $\theta_2$, covers the time period from the current time to a future time in the current processing cycle $\vartheta$. In this way, the key events 120 processed with the largest delay are the key events received at the beginning of the first time window $\theta_1$. This delay is smaller than that of the method discussed above. However, this method involves estimating the number of key events 120 to be received in the second time window $\theta_2$ because they have not been received yet at the current time (i.e., at the beginning of the current processing cycle).

In certain implementations, the first time window $\theta_1$ is determined by the receiving time of the key events in the key event queue 114. For example, the first time window $\theta_1$ starts from the time of the oldest event in the key event queue 114 and ends at the current time. The second time window $\theta_2$ is determined using the time of the key events in the key event queue 114 and a Weibull distribution. The number of events in the first time window $\theta_1$ is determined by the key events in the key event queue. The number of events in the second time window $\theta_2$ is estimated by utilizing the Weibull distribution. Additional details regarding determining the first time window $\theta_1$ and the second time window $\theta_2$, and estimating the number of key events 120 in the second time window $\theta_2$ are provided below with regard to FIGS. 3-6.

The key smoothener and predictor module 112 further aggregates the key events 120 estimated for the current processing cycle $\vartheta$ into a single aggregated event 122. The aggregated key event 122 indicates the total number of keypresses included in the estimated key events. For example, if the key smoothener and predictor module 112 determines that there are seven key events of the "down" key in the first time window $\theta_1$ and estimates that there will be three key events of the "down" key in the second time window $\theta_2$, the key smoothener and predictor module 112 will generate an aggregated key event 122. This aggregated key event 122 can indicate that there are a total of ten keypresses of the "down" key to be processed by the processing component 110. As a result, the processing component 110 processes the multiple keypresses indicated by the aggregated key event 122 together, rather than separately processing individual key events representing respective keypresses. Based on the processing results, the processing component 110 or another component of the software application 104 generates a user interface update 134, which is utilized to update the user interface 130 shown on the display device 132.

Continue with the above example, if a keypress of the "down" key input through the user interface 130 represents a command to display the next page of a document showing in the user interface 130, the aggregated key event 122 for ten keypresses represents a command to display the next ten pages of the document. Accordingly, the processing component 110 processes the aggregated key event 122 by updating the user interface 130 to show the next ten pages with a higher speed, or to skip the first nine pages and directly show the tenth page. In either case, the processing time of the total ten keypresses in the aggregated key event 122 is shorter than the time of processing ten key events one by one. In another example where the software application 104 is an image processing application, the user interface 130 is configured to display an image for editing. A "down" keypress represents a command to shift a selected object down by one pixel in the image. In this example, the processing component 110 processes the aggregated key event 122 by loading the image into the memory once, moving the selected object down by ten pixels, and then unloading the image from the memory. Compared with processing ten key events 120 one by one (including loading and unloading the image ten times), processing the aggregated key event 122 can be performed in a much shorter time period, thereby significantly reducing the response time to the keypresses.

In the above examples, the seven key events 120 in the first time window 91 are the key events 120 that have already been received. The three key events 120 in the second time window $\theta_2$ are predicted key events 120 in anticipation of additional keypresses received from the key-based input device 108. Depending on the type of application and the habit of the user, the prediction may be inaccurate. As such, the aggregated key event 122 is further configured to adjust the estimation algorithm used to estimate the number of key events 120 in the second time window $\theta_2$. Details of the adjustment are provided below with regard to FIG. 3. Additional details regarding the key event smoothening and prediction are described herein with respect to FIGS. 2-6.

Although FIG. 1 shows only one key smoothener and predictor module 112 in the software application 104, multiple key smoothener and predictor module 112 can be included in the software application 104 for different processing components. For instance, the software application 104 includes multiple processing components 110 each configured to manage (e.g., generating, presenting, or processing events for) a user interface 130 or a portion of the user interface 130. In this scenario, the same keypress in different user interfaces 130 or different portions of the user interface 130 may represent different commands and thus be processed differently. To address these differences, the software application 104 is configured to include a key smoothener and predictor module 112 for each processing component 110. As such, each key smoothener and predictor module 112 is associated with one processing component 110 and is configured to processes the key events 120 for that processing component 110.

Likewise, although FIG. 1 shows only one software application 104 executing on the computing device 102, there can be multiple software applications 104 executing on the computing device 102. Each of these software applications 104 can include one or more key smoothener and predictor modules 112 for the one or more processing components 110 contained in the corresponding software application 104 as discussed above.

Further, the "down" key is mentioned in the examples described above and in the following for illustration purposes only and should not be construed as limiting The technology presented herein applies to any other keys of the key-based input device 108, such as the up key, the left key, the right key, the page up key, the page down key, and so on.

Figure 2:
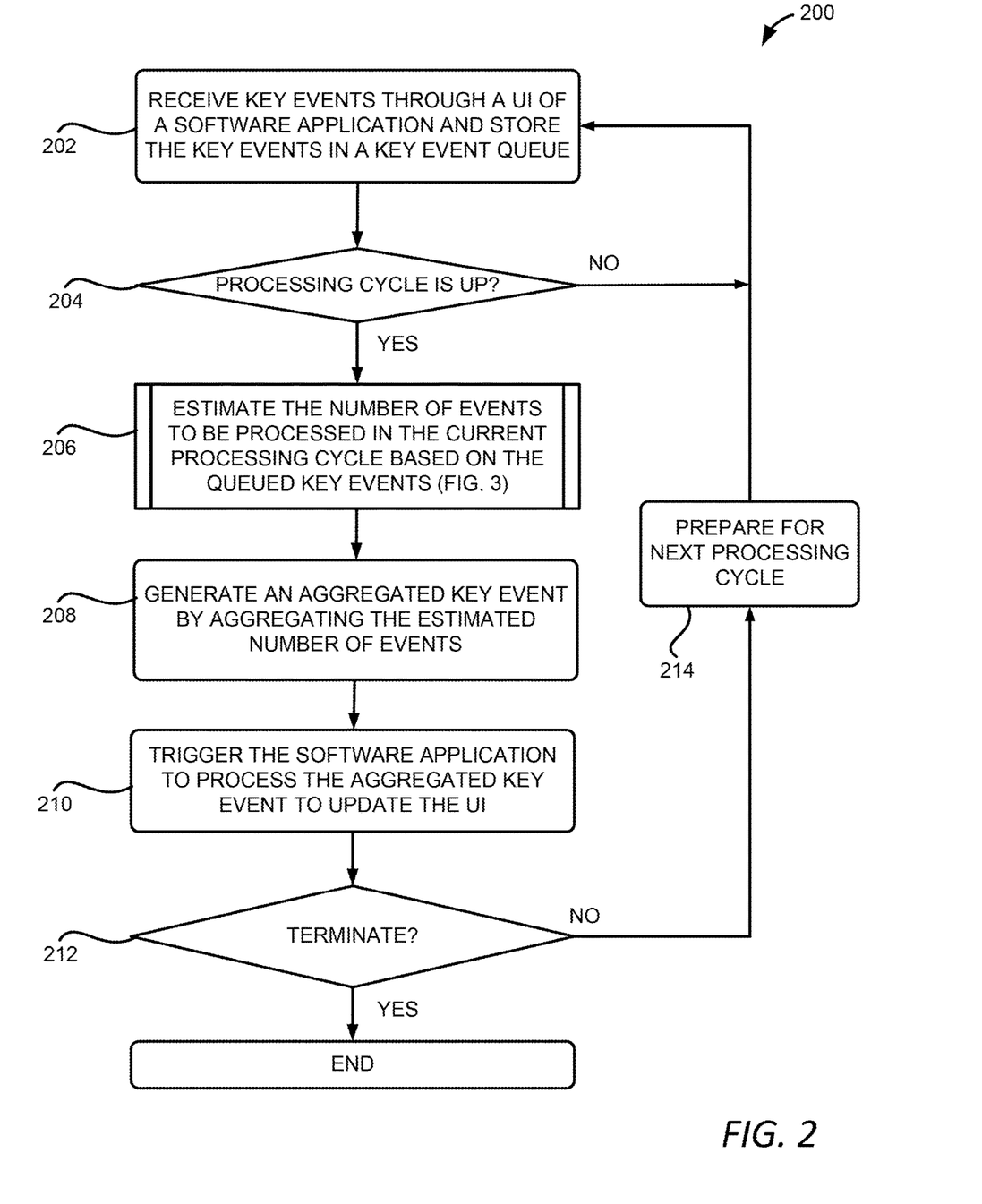
FIG. 2 depicts an example of a process for smoothening and predicting keypress events for a software application, according to certain aspects of the present disclosure.

Examples of Computer-Implemented Operations for Key Event Smoothening and Prediction FIG. 2 depicts an example of a process 200 for smoothening and predicting key events for a software application, according to certain aspects of the present disclosure. One or more computing devices (e.g., the computing device 102) implement operations depicted in FIG. 2 by executing suitable program code (e.g., the software application 104). For illustrative purposes, the process 200 is described with reference to certain examples depicted in the figures. Other implementations, however, are possible.

At block 202, the process 200 involves the key smoothener and predictor module 112 of the software application 104 receiving key events 120 from the operating system of the computing device 102. The key events 120 are generated by the operating system 106 in response to keypresses detected from the key-based input device 108. The software application 104 presents a user interface 130 on a display device 132. The user interface 130 allows a user of the software application 104 to interact with the software application 104 through the key-based input device 108, such as a keyboard. When a user operates the key-based input device 108, the operating system 106 detects the keypresses and generates a key event 120 for each keypress and sends the key events 120 to the software application 104 as they are generated. Upon receiving the key events 120, the software application 104 directs the key events 120 to the processing component 110 configured for processing these key events 120. If the processing component 110 has a key smoothener and predictor module 112 associated with it, the software application 104 sends the key events 120 to the corresponding key smoothener and predictor module 112 instead of sending them directly to the processing component 110. The key smoothener and predictor module 112 puts the key events 120 into a key event queue 114 as they are received.

In some implementations, a key event queue is maintained for each category of keys. For instance, because "up" key and "down" key are in the same category, one key event queue is maintained for these two keys. "Enter" key is in a different category from the "up" and "down" keys. So a separate key event queue is maintained for the "enter" key. The key event queues for other keys can be built similarly.

At block 204, the process 200 involves the key smoothener and predictor module 112 determining whether it is the time to generate an aggregated key event 122 for the current processing cycle. The key smoothener and predictor module 112 processes the key events 120 for every processing cycle $\vartheta$. As discussed above, the length of the processing cycle $\vartheta$ depends on various factors, such as the processing time of a key event by the processing component 110, the user interface update rate agreeable to the user, and so on. The processing cycle $\vartheta$ for the processing component 110 is set to be longer if the processing time of a key event by the processing component 110 is longer; and vice versa. Likewise, if the user interface update rate is low, then the processing cycle $\vartheta$ can be set to a large value. In some implementations, the processing cycle $\vartheta$ is set to be no less the processing time of a key event by the processing component 110.

For a given processing cycle $\vartheta$, the key smoothener and predictor module 112 collects the key events 120 from the operating system 106 during the previous processing cycle $\vartheta$. At the beginning of the current processing cycle $\vartheta$, the key smoothener and predictor module 112 calculates the total number of key events to be processed by the processing component 110 in the current processing cycle and triggers the processing by sending an aggregated key event 122. As such, at block 204, the key smoothener and predictor module 112 in effect determines whether it is time to generate the aggregated key event 122 for the processing component 110.

In some examples, the key smoothener and predictor module 112 maintains a timer configured to measure the time that has passed since the beginning of the last processing cycle. If the timer indicates that V time has not passed (i.e., the previous processing cycle $\vartheta$ has not completed), the key smoothener and predictor module 112 continues to receive and queue the key events 120 at block 202. If the timer indicates that $\vartheta$ time has passed (i.e., the previous processing cycle $\vartheta$ has completed), the key smoothener and predictor module 112 determines that the current time is the beginning of the current processing cycle and it is time to process the events for the current processing cycle. The process 200 involves, at block 206, the key smoothener and predictor module 112 estimating the number of key events 120 to be processed by the processing component 110 for the current processing cycle $\vartheta$. The estimation includes determining the number of key events 120 actually received during a time window $\theta_1$ of the previous processing cycle, and also estimating the number of key events 120 to be received in a future time window $\theta_2$ of the current processing cycle $\vartheta$. The total number of events to be processed by the processing component 110 thus includes the number of events in the time window $\theta_1$ and the future time window $\theta_2$. Details of estimating the number of key events are provided below with regard to FIG. 3.

At block 208, the process 200 involves the key smoothener and predictor module 112 generating a single aggregated key event 122 by aggregating the estimated number of key events. The aggregated key event 122 includes a number indicating the estimated total number of keypresses to be processed by the processing component 110. For example, if the key smoothener and predictor module 112 determines that there are seven key events of the "down" key in the first time window $\theta_1$ and estimates that there will be three key events of the "down" key in the second time window $\theta_2$, the key smoothener and predictor module 112 will generate an aggregated key event 122 indicating that there are a total of ten keypresses of the "down" key to be processed by the processing component 110.

At block 210, the process 200 involves the key smoothener and predictor module 112 triggering the processing component 110 of the software application 104 to process the aggregated key event 122 by sending the aggregated key event 122 to the processing component 110. Continuing the above example, the processing component 110 processes the multiple keypresses of the "down" key indicated by the aggregated key event 122 together, rather than separately processing individual key events representing respective keypresses. Further, because the processing cycle $\vartheta$ is determined by taking into account the processing speed of key events by the processing component 110, the processing component 110 has finished or will soon finish the processing of the last aggregated key event 122 and is ready to process the current aggregated key event 122 sent by the key smoothener and predictor module 112. In this way, there will be no delay or little delay in processing the aggregated key event 122 by the processing component 110.

As the processing component 110 processes the aggregated key event 122, the software application 104 updates the user interface 130 to reflect the changes made by the processing component 110 according to the command indicated by the key events. For example, if a key event represents a command to display the next page of a document showing in the user interface 130, the aggregated key event 122 for ten key events represents a command to display the next ten pages of the documents. The processing component 110 thus can process the aggregated key event 122 by updating the user interface 130 to show the next ten pages with a higher speed, or to skip the first nine pages and directly show the tenth page. In either case, the processing time of the total ten keypresses in the aggregated key event 122 is shorter than the time of processing ten key events one by one. In another example where the software application 104 is an image processing application, the user interface 130 is configured to display an image for editing. A keypress of the "down" key represents a command to shift a selected object down by one pixel in the image. In this example, the processing component 110 processes the aggregated key event 122 by loading the image into the memory once, moving the selected object down by ten pixels, and then unloading the image from the memory. Compared with processing ten key events 120 one by one (including loading and unloading the image ten times), processing the aggregated key event 122 can be performed in a much shorter time period, thereby significantly reducing the response time to the keypresses.

At block 212, the process 200 involves the key smoothener and predictor module 112 determining whether to terminate the process. The key smoothener and predictor module 112 can determine that the process should be terminated if the software application 104 has received an instruction from the user to terminate the software application 104. The key smoothener and predictor module 112 can also terminate the process if an instruction is received to disable the key smoothening and predicting function. The key smoothener and predictor module 112 can terminate the process in other scenarios as well.

If the key smoothener and predictor module 112 determines not to determinate the process, the key smoothener and predictor module 112 prepares for the next processing cycle $\vartheta$ at block 214. The preparation includes, for example, resetting the timer configured to measure the time to zero, and clearing the key event queue 114. The key smoothener and predictor module 112 then receives new key events for the next processing cycle $\vartheta$ at block 202.

Figure 3:
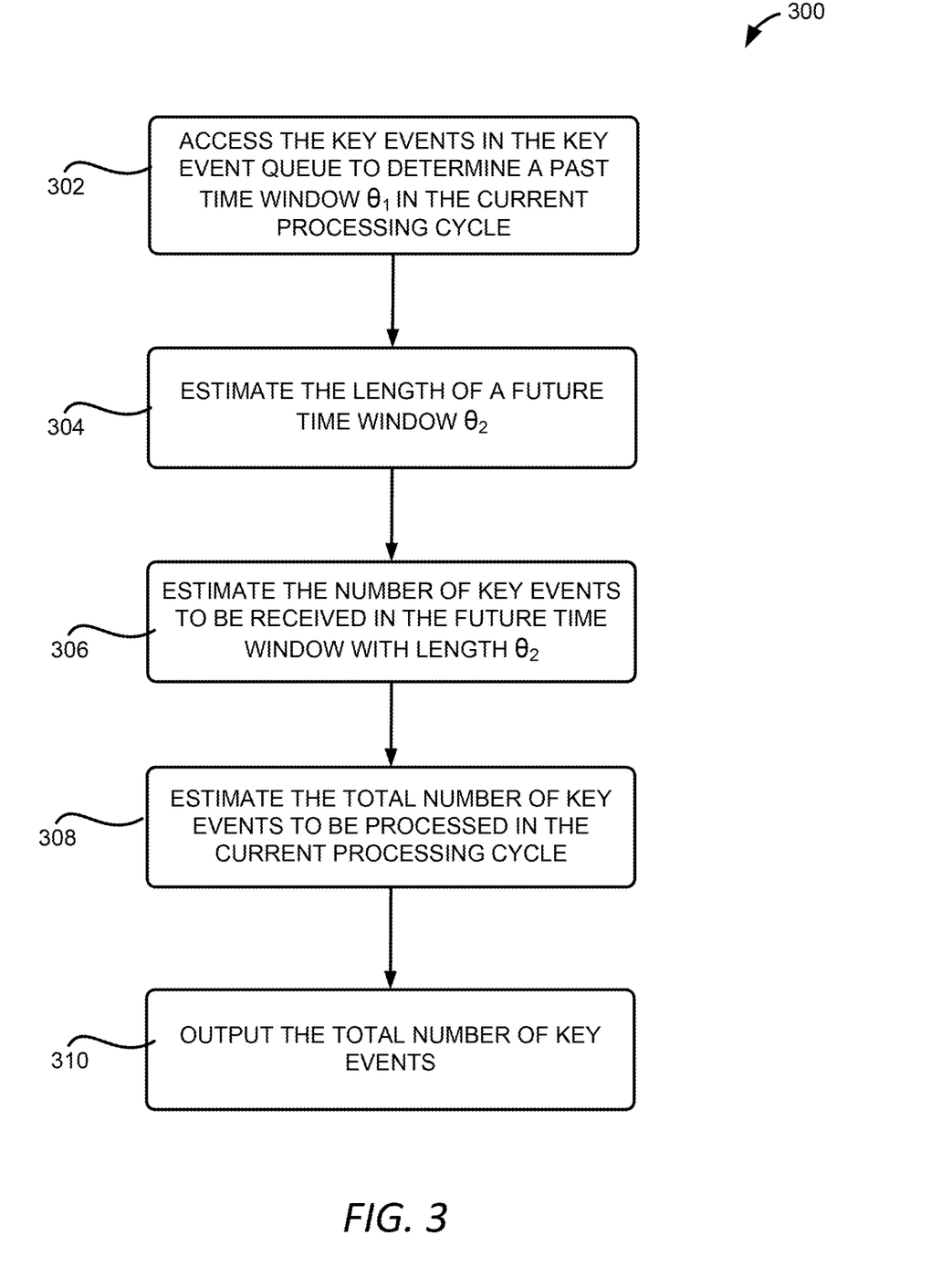
FIG. 3 depicts an example of a process for estimating the number of keypress events to be processed in the current processing cycle of a software application, according to certain aspects of the present disclosure.
Figure 4:
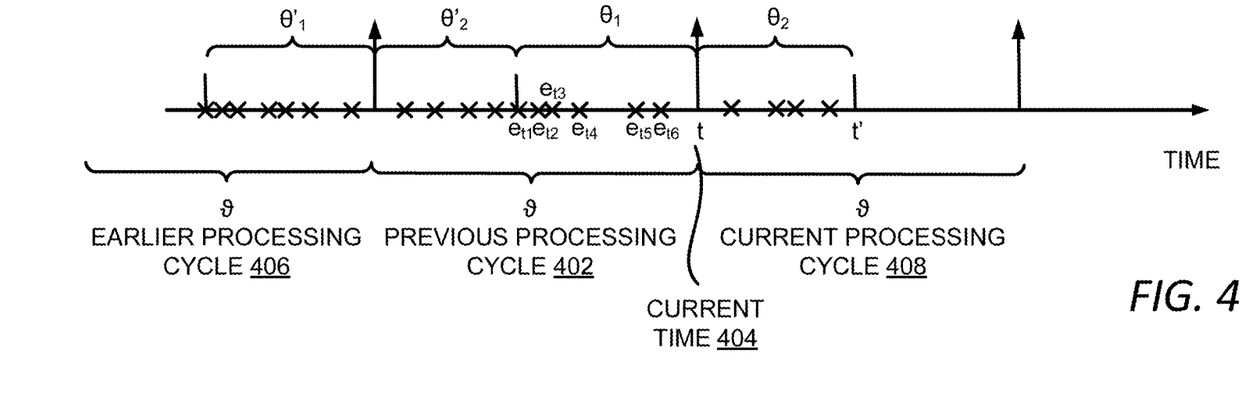
FIG. 4 depicts an example of keypress events received over a period of time, the processing cycle, and the different time windows in a processing cycle of the software application utilized to facilitate the estimation of keypress events, according to certain aspects of the present disclosure.
Figure 5:
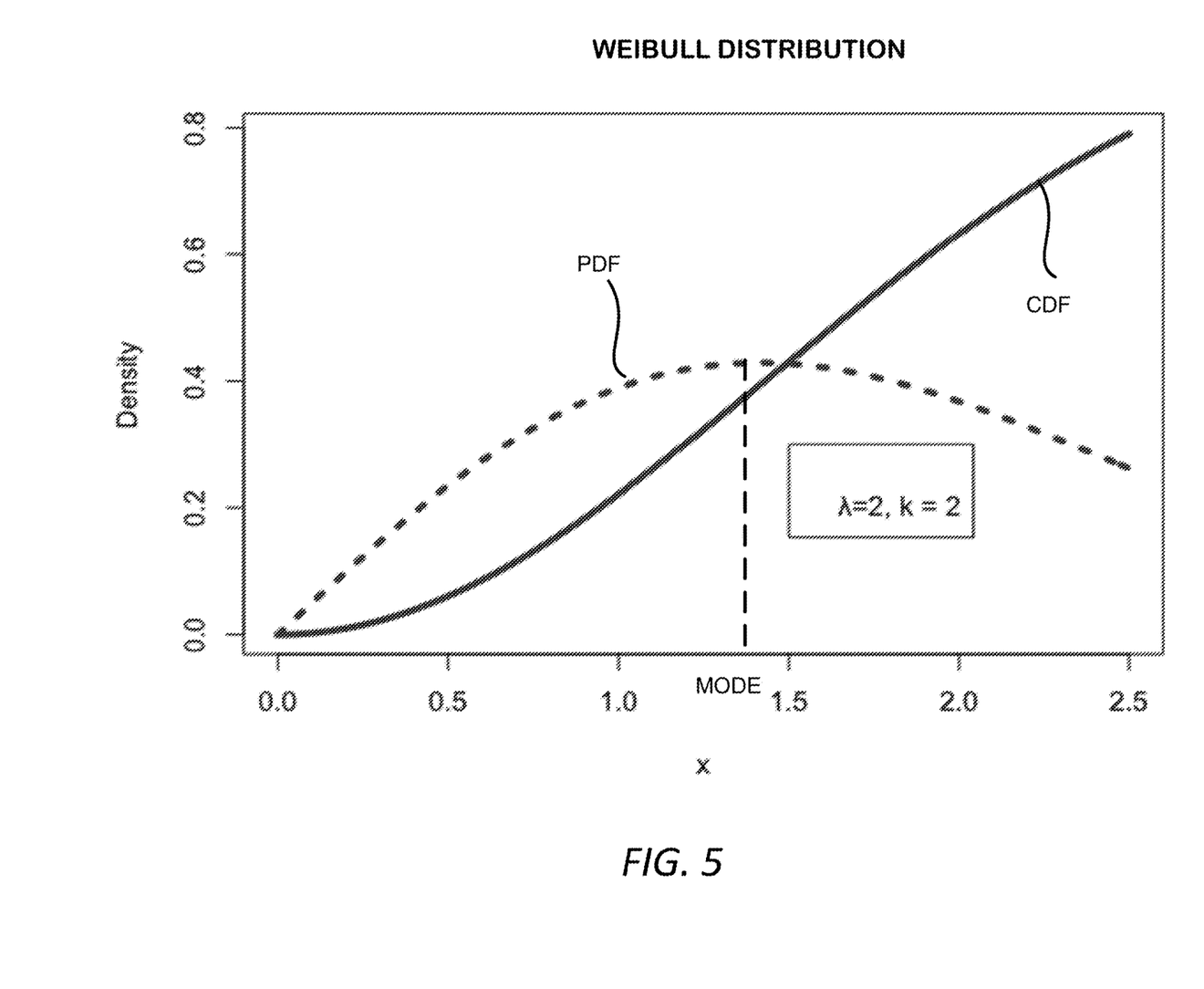
FIG. 5 depicts an example of a probability density function and a cumulative density function of a Weibull distribution.

FIG. 3 depicts an example of a process 300 for estimating the number of events to be processed in the current processing cycle of the processing component 110, according to certain aspects of the present disclosure. One or more devices (e.g., the computing device 102) implement operations depicted in FIG. 3 by executing suitable program code (e.g., the software application 104 or, more specifically, the key smoothener and predictor module 112). FIG. 3 will be described jointly with FIGS. 4-5. FIG. 4 depicts an example of key events received over a period of time, the processing cycle, and the different time windows in processing cycles of the processing component 110 of the software application 104. FIG. 5 depicts an example of a probability density function and a cumulative density function of a Weibull distribution. For illustrative purposes, the process 300 is described with reference to certain examples depicted in the figures. Other implementations, however, are possible.

At block 302, the process 300 involves the key smoothener and predictor module 112 accessing the key events 120 stored in the key event queue 114 and determining a time window $\theta_1$ in the current processing cycle for counting the number of key events. FIG. 4 shows an example of key events 120 received by the key smoothener and predictor module 112 over a period of time. In FIG. 4, the horizontal axis represents the time and cross signs "x" represent the key events 120 received by the key smoothener and predictor module 112 at different time points. FIG. 4 also shows different processing cycles including the previous processing cycle 402 immediately before the current time t 404 and the current processing cycle 408 starting from the current time t 404. Because, in the above example discussed in FIG. 2, determining the number of events to be processed by the processing component 110 for the current processing cycle occurs at the beginning of the current processing cycle, the current time t is at the beginning of the current processing cycle 408.

The length of a processing cycle is denoted as $\vartheta$. The key smoothener and predictor module 112 forms an event list $L=\{e_{t_i}\}$, $i=1, \ldots, n$ based on the key events 120 in the key event queue 114. Here, n is the number of events in the event list L and $t_i$ denotes the time when the event $e_{t_i}$ is received. In some examples, the key events in the event list L include the events in the key event queue 114 that are received after the time window $\theta'_2$ in the previous processing cycle 402. The time window $\theta'_2$ in the previous processing cycle is estimated when the key smoothener and predictor module 112 processes the key events for the previous processing cycle 406. As such, the key events received during the time window $\theta'_2$ have already been taken into account in the previous processing cycle 402 and will not be counted for the current processing cycle 408.

In the example shown in FIG. 4, at the current time t, there are six key events in the key event queue 114 forming an event list $L=\{e_{t_1}, e_{t_2}, e_{t_3}, e_{t_4}, e_{t_5}, e_{t_6}\}$. The locations of these events on the horizontal axis indicate their respective received times. In some examples, the time window $\theta_1$ in the previous processing cycle 402 is determined to be the time period from the received time $t_1$ of the oldest event $e_{t_1}$ in L to the current time t. Thus, the length of the time window $\theta_1=t-t_1$.

Referring back to FIG. 3, at block 304, the process 300 involves the key smoothener and predictor module 112 estimating the length of the future time window $\theta_2$ in the current processing cycle. In some examples, estimating the time window $\theta_2$ is performed based on the key events in the event list L and a Weibull distribution. The probability density function of a Weibull distribution can be formulated as:

$$f(x; \lambda, k) = \frac{k}{\lambda}\left(\frac{x}{\lambda}\right)^{k-1} e^{-(x/\lambda)^k} \quad (1)$$

where $\lambda$ and k are scale and shape parameters of the Weibull distribution. FIG. 5 shows the probability density function $f(x; \lambda, k)$ (dotted line) and the cumulative density function (solid line) denoted as $F(x; \lambda, k)$ of a Weibull distribution with $\lambda=2$, and k=2. In various implementations of the technology presented herein, the scale parameter $\lambda$ takes a value in the range of [1.25, 4] and the shape parameter k takes a value in the range of [1, 4]. FIG. 5 also denotes the mode of the Weibull distribution (i.e., the value x at which its probability density function has a local maximum value).

To estimate the time window $\theta_2$, the key smoothener and predictor module 112 selects key events 120 from the event list L to form a mode list ML. The mode list ML includes key events whose received time $t_i$ satisfy $F(t-t_i; \lambda, k) > F(\text{mode}; \lambda, k)$. The key smoothener and predictor module 112 further selects the newest event in the mode list ML and estimates the time t' so that $F(t'-t_m); \lambda; k) > 0.9$, where $t_m$ is the received time of the selected newest event.

The key smoothener and predictor module 112 further evaluates the estimated time t'. If $\vartheta < \theta_1 + (t'-t)$, then the key smoothener and predictor module 112 updates the mode list ML by removing the selected newest event $e_{t_m}$ from the mode list ML. The key smoothener and predictor module 112 repeats the above process using the updated mode list ML. That is, the key smoothener and predictor module 112 selects the newest events in the updated mode list ML and estimate the time t' again. If $\vartheta \geq \theta_1 + (t'-t)$, then the key smoothener and predictor module 112 determines that the estimated $\theta_2$ equals t'-t.

In the example shown in FIG. 4, the mode list ML={$e_{t1}$, $e_{t2}$, $e_{t3}$, $e_{t4}$}. The key smoothener and predictor module 112 determines that $e_{t4}$ is the latest event in the ML and determines t' such that $F(t'-t_4); \lambda; k) > 0.9$. If the key smoothener and predictor module 112 determines that $\vartheta < \theta_1 + (t'-t)$, the key smoothener and predictor module 112 removes $e_{t4}$ from the mode list ML. The updated mode list ML becomes ML={$e_{t1}$, $e_{t2}$, $e_{t3}$} and the latest event becomes $e_{t3}$. The key smoothener and predictor module 112 estimate t' again using $e_{t3}$ such that $F(t'-t_3); \lambda; k) > 0.9$. If $\vartheta < \theta_1 + (t'-t)$, the key smoothener and predictor module 112 repeats this process; otherwise, the key smoothener and predictor module 112 uses the t' to determine $\theta_2$ as t'-t. FIG. 4 shows the t' and $\theta_2$ for the current processing cycle 408.

At block 306, the key smoothener and predictor module 112 estimates the number of key events to be received during the second time window $\theta_2$. In some examples, the key smoothener and predictor module 112 estimates the number of key events using the mode list ML. For each event $e_{ti}$ in the mode list ML, the key smoothener and predictor module 112 determines a weight $w_i$. At the beginning, the weight $w_i$ is initialized as a random or pseudorandom value, such as a random or pseudorandom value between 0 and 1. In this example, the number of events in $\theta_2$ is estimated as $$N_{\theta_2} = \sum_{i=1}^{|ML|} \frac{f(e_{t_i}; \lambda, k)}{1 + e^{-\left(1+\frac{w_i}{i}\right)^i}}. \quad (2)$$

At block 308, the key smoothener and predictor module 112 estimates the total number of key events to be processed in the current processing cycle 408 as the sum of the number of events in the event list L and the estimated number of events in $\theta_2$, $N_{\theta_2}$. Since in Eqn. (2), $$e^{-\left(1+\frac{w_i}{i}\right)^i} \to e^w,$$

when i increases, the algorithm has a tendency to give more preference to newer events in ML for prediction purposes. Note that if at block 302, the key smoothener and predictor module 112 determines that $\theta_1 \geq \vartheta$, then the key smoothener and predictor module 112 may skip blocks 304 and 306, and estimates the total number of events to be the number of event in L at block 308. It should be noted the above calculation of number events assume that the events in the key event queue or to be in the key event queue are the same. In examples, some events in the key events queue include key events that cancel the effect of other key events. For instance, an "up" key event may cancel the effect of a "down" event. In those scenarios, the number of key events will be calculated by taking into account the cancelling effect (e.g., three "down" key events and one "up" key event will be calculated as two "down" key events). At block 310, the key smoothener and predictor module 112 outputs the estimated total number of key events.

In some implementations, the key smoothener and predictor module 112 also updates the weights {$w_i$} each time the total number of key events for the current processing cycle is estimated. For example, the key smoothener and predictor module 112 checks error in predicted values and does one pass update to weight values based on the error of gradient. For example, the weight update can be based on Stochastic Gradient Descent (online learning with one example processed at a given time). The gradients are estimated based on feedback error and division of it by time incurred. This will provide a rough first order approximation to time delta. In order for system to remain sane, weighted estimation of gradient is performed by having a queue of 5 old events.

Table 1 below shows the pseudocode of an example of the implementation of the key smoothening and prediction presented herein.

TABLE 1

Weibull Key Smoothener and Predicator Algorithm

Input: A stream of events $e_{t1}$, $e_{t2}$, $e_{t3}$, . . . along an Infinite Time horizon
Output: Trigger spaced at $\vartheta$ time intervals
weights = random initialize(20) /* weights associated with events in mode list ML */
events = [ ] /* event queue [$e_{ti}$] */
clock = Clock( )
previousTriggerTime = Clock( )
$\vartheta \leftarrow$ 200 ms
percentile $\leftarrow$ 0.9
Function OnEvent($e_{ti}$):
    events $\Leftarrow e_{ti}$
    return
Function Main:

TABLE 1-continued

Weibull Key Smoothener and Predicator Algorithm

```
while True do
    if clock( ) > ϑ then
        n ← length(events)
        L = [ ]
        for i ← 0 to n − 1 do
            L ⇐ events
        end for
        updateWeightsBasedonErrorInLastCycle(L)
        t ← getLatestTime(L)
        ModeList ← filter(L,f (t − time(event)) > mode(f))
        θ₁ ← t − previousTriggerTime
        ModeList ← getPercentileCrossers(percentile,ModeList, ϑ − θ1)
        θ₂ ← t − getPercentileCrossTime(getLatestTime(ModeListMod))
        m ← |ModeList|
        predictedEventCount ← 0
        for i ← 0 to m − 1 do
```

$$v \leftarrow \frac{WeibullCDF(\text{time}(e_{t_i}) - t, 2, 2)}{1 + \exp\left(-\left(1 + \frac{w_{i+1}}{i+1}\right)^{i+1}\right)}$$

```
            predictedEventCount ← predictedEventCount + v;
        end for
        eventcount ← |L| + round(predictedEventCount)
        triggerEvent(eventcount)
        previousTriggerTime ← t
    end if
end while
return newList
```

Figure 6:
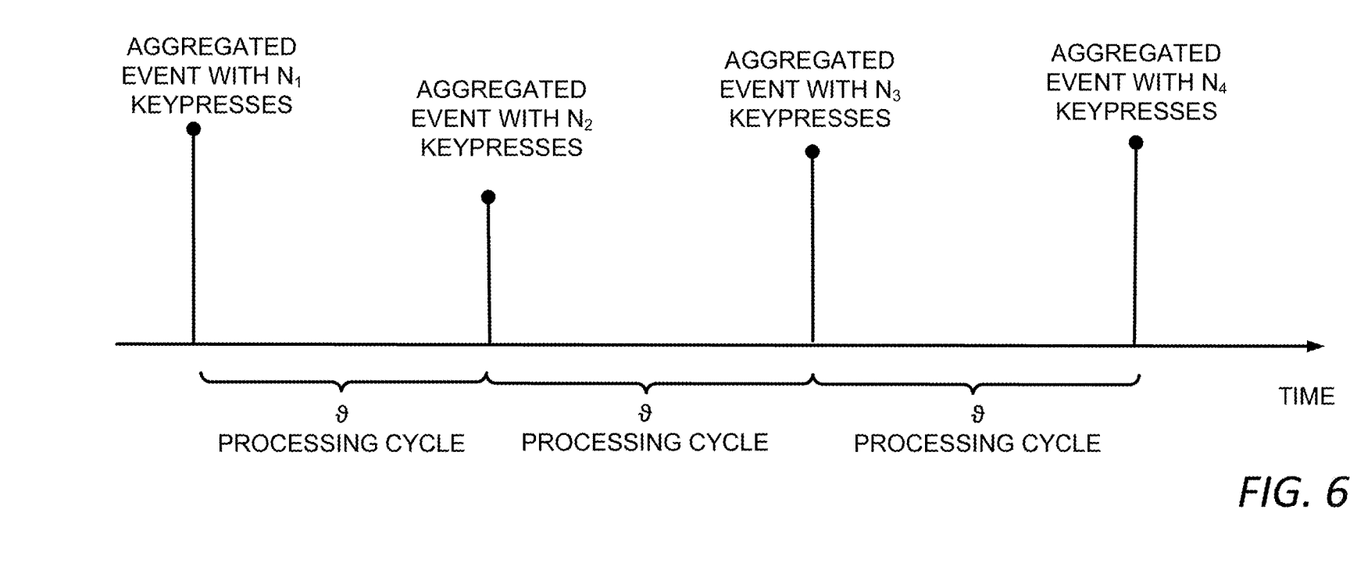
FIG. 6 depicts an example of aggregated key events sent to the software application after the key event smoothening and predicting, in accordance with certain aspects of the present disclosure.

FIG. 6 depicts an example of aggregated key events 122 sent to the software application 104 after applying the key event smoothening and predicting in accordance with certain aspects of the present disclosure. As shown in FIG. 6, the aggregated key events 122 are sent to the processing component 110 in constant time intervals. The height of each aggregated key event 122 represents the number of keypresses included in the corresponding aggregated key event 122. In contrast, the raw key events 120 $e_{t_i}$ shown in FIG. 4 are received at irregular intervals and multiple raw key events 120 may be received within a short period of time causing delays in the processing component 110.

Figure 7:
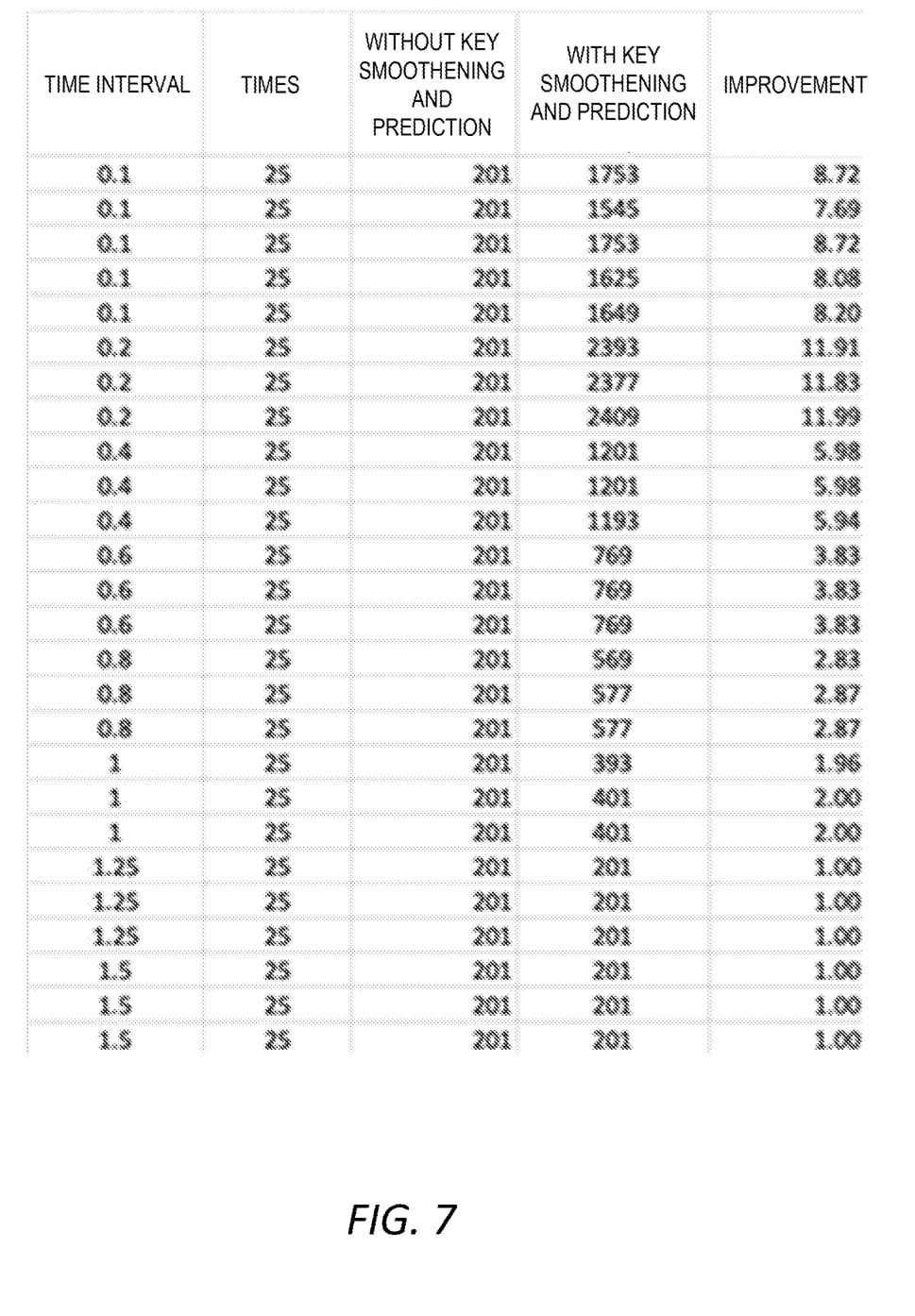
FIG. 7 depicts an example of experiment results comparing processing results of the application with and without the key event smoothening and predicting in accordance with certain aspects of the present disclosure.

FIG. 7 shows an example of experimental results generated by utilizing the technologies proposed herein. In this example, the experiment involved moving through image rows in a matrix in a software application for which the user used to get slugginess when Up-Down Keys were pressed fast. The processing cycle ϑ is set to 0.2 s. The first column of the table shown in FIG. 7 is the interval at which key events are created. The second column shows the number of time the algorithm is run for the corresponding setting. The application without the key smoothening and prediction is serving events at a constant rate. When configured with the key smoothening and prediction, the application can aggregate events, and hence can scale well to process more events during a processing cycle. The experiment results in FIG. 7 shows that without the key smoothening and prediction presented herein, the application can move only 201 rows, whereas it can move 1753 rows with the key smoothening and prediction when the time interval is 0.1 s. This means the application can process multiple events with the proposed key smoothening and prediction, leading to faster response to user input. The improvement can be as high as 12 times when key events are generated at a 0.2 s interval. It can also be seen from FIG. 7 that the key smoothening and prediction presented herein is also able to serve key events when they are generated slowly.

Computing System Example for Implementing Key Smoothening and Prediction

Figure 8:
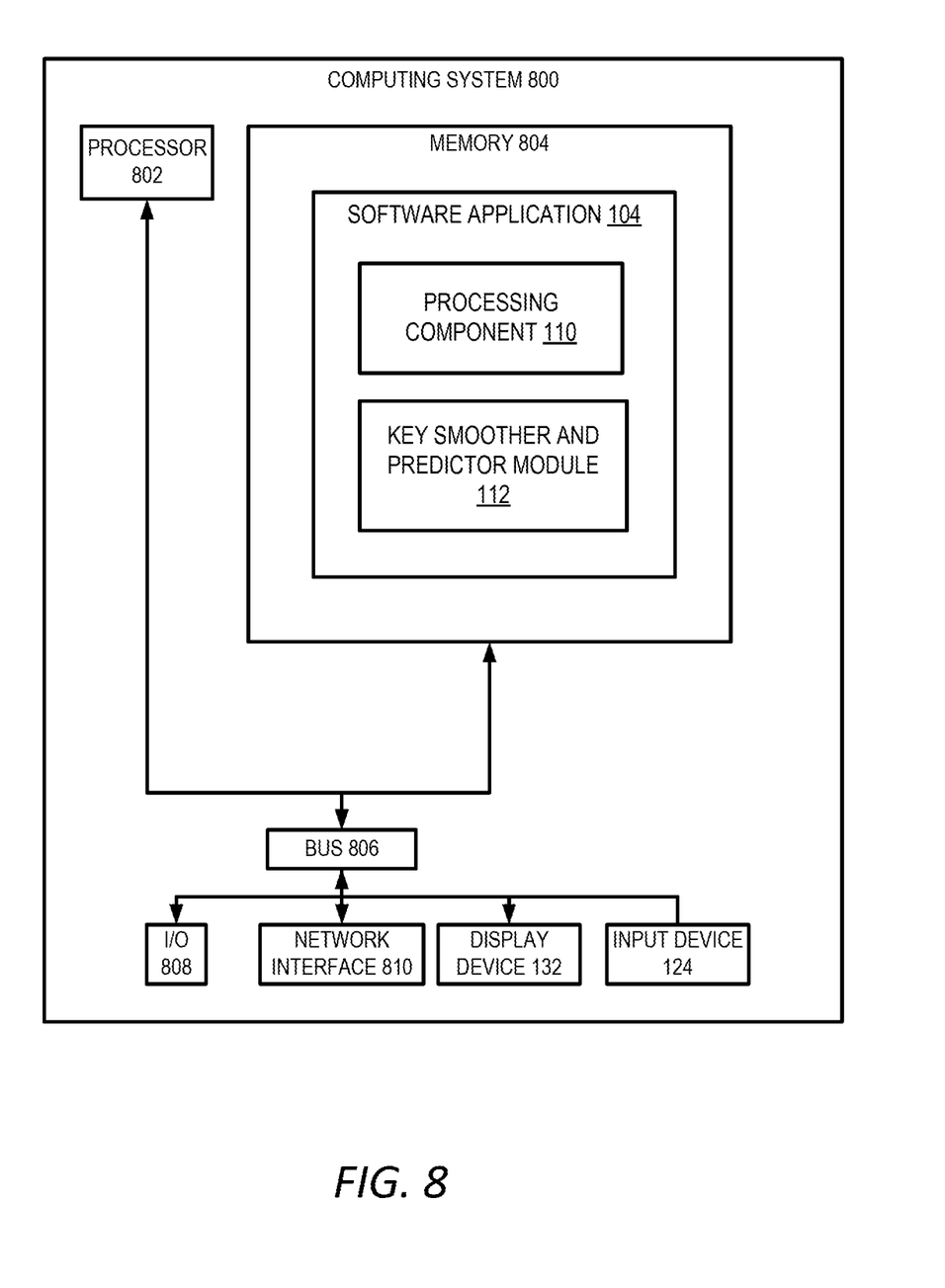
FIG. 8 depicts an example of a computing system that executes a software application for performing certain aspects of the present disclosure.

Any suitable computing system or group of computing systems can be used for performing the operations described herein. For example, FIG. 8 depicts an example of a computing system 800 that can implement the computing environment of FIG. 1. In some embodiments, the computing system 800 includes a processing device 802 that executes the software application 104, a memory that stores various data computed or used by the software application 104, an input device 124 (e.g., a key-based input device such as a keyboard, a remote control, a device controller, etc.), and a display device 132 that displays graphical content generated by the software application 104. For illustrative purposes, FIG. 8 depicts a single computing system on which the software application 104 is executed, and the input device 124 and display device 132 are present. But these applications and devices can be stored or included across different computing systems having devices similar to the devices depicted in FIG. 8.

The depicted example of a computing system 800 includes a processing device 802 communicatively coupled to one or more memory devices 804. The processing device 802 executes computer-executable program code stored in a memory device 804, accesses information stored in the memory device 804, or both. Examples of the processing device 802 include a microprocessor, an application-specific integrated circuit ("ASIC"), a field-programmable gate array ("FPGA"), or any other suitable processing device. The processing device 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, such as an input device 124, a display device 132, or other input or output devices. For example, the computing system 800 is shown with one or more input/output ("I/O") interfaces 808. An I/O interface 808 can receive input from input devices or provide output to output devices. One or more buses 806 are also included in the computing system 800. The buses 806 communicatively couples one or more components of a respective one of the computing system 800.

The computing system 800 executes program code that configures the processing device 802 to perform one or more of the operations described herein. The program code includes, for example, the software application 104 or other suitable applications that perform one or more operations described herein. The program code may be resident in the memory device 804 or any suitable computer-readable medium and may be executed by the processing device 802 or any other suitable processor. In some embodiments, all modules in the software application 104 (e.g., the processing component 110, the key smoothener and predictor module 112, etc.) are stored in the memory device 804, as depicted in FIG. 8. In additional or alternative embodiments, one or more of these modules from the software application 104 are stored in different memory devices of different computing systems.

In some embodiments, the computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and/or the like. The computing system 800 is able to communicate with one or more other computing devices (e.g., a computing device that receives inputs for the software application 104 or displays outputs of the software application 104) via a data network using the network interface device 810.

An input device 124 can include any device or group of devices suitable for receiving visual, auditory, or other suitable input that controls or affects the operations of the processing device 802. Non-limiting examples of the input device 124 include a touchscreen, stylus, a mouse, a keyboard, a microphone, a separate mobile computing device, etc. A display device 132 can include any device or group of devices suitable for providing visual, auditory, or other suitable sensory output. Non-limiting examples of the display device 132 include a touchscreen, a monitor, a separate mobile computing device, etc.

Although FIG. 8 depicts the input device 124 and the display device 132 as being local to the computing device that executes the software application 104, other implementations are possible. For instance, in some embodiments, one or more of the input device 124 and the display device 132 can include a remote client-computing device that communicates with the computing system 800 via the network interface device 810 using one or more data networks described herein.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method in which a computing device performs operations comprising:
   receiving, by a key smoothener and predictor module of an application executing on the computing device, a sequence of key events from an input device of the computing device and through a user interface of the application;
   storing, the sequence of key events in a key event queue;
   predicting, based on the sequence of key events in the key event queue, a number of key events for processing in a current processing cycle of the application to be a sum of (a) one or more key events in a list of key events currently stored in the key event queue and received before the current processing cycle and (b) an estimated number of key events to be received in a future time window;
   processing, by a processing component of the application, an aggregated key event indicating a plurality of keypresses, wherein a number of the plurality of keypresses equals the predicted number of key events for the current processing cycle; and
   causing, by the application, the user interface of the application to be updated based on processing the aggregated key event.

2. The computer-implemented method of claim 1, wherein predicting the number of key events further comprises:
   accessing the key event queue to retrieve the list of key events;
   estimating the future time window based on the list of key events; and
   determining the estimated number of key events to be received in the future time window.

3. The computer-implemented method of claim 2, wherein estimating the future time window based on the list of key events comprises:
   identifying a mode list of key events by selecting one or more key events from the list of key events using a Weibull distribution;
   determining a latest key event in the mode list;
   determining a future time point based on a time of the latest key event and the Weibull distribution; and
   estimating the future time window as a time window from a current time to the future time point.

4. The computer-implemented method of claim 3, further comprising:
   determining a past time window to be from an oldest key event in the list of key events to the current time;
   determining that a sum of a duration of the past time window and a time difference between the current time to the future time point is larger than a duration of the current processing cycle;
   updating the mode list of key events by removing the latest key event from the mode list of key events;
   determining the latest key event in the updated mode list;
   determining the future time point based on the time of the latest key event and the Weibull distribution; and
   estimating the future time window as a time window from a current time to the future time point.

5. The computer-implemented method of claim 3, wherein determining the estimated number of key events to be received in the future time window comprises calculating the number of key events by summing a plurality of values determined using the Weibull distribution and a set of weights for the key events in the mode list.

6. The computer-implemented method of claim 5, wherein the Weibull distribution has a shape parameter between 1.25 and 4 and a scale parameter between 1 and 4.

7. The computer-implemented method of claim 5, further comprising:
   updating the set of weights based on a feedback error calculated using the estimated number of key events to be received in the future time window and received events in the future time window.

8. A system comprising:
   a processing device;
   an input device; and
   a non-transitory computer-readable medium communicatively coupled to the processing device, wherein the processing device is configured to execute program code of a software application stored in the non-transitory computer-readable medium and thereby perform operations comprising:
     storing a sequence of key events received from the input device through a user interface of the software application in a key event queue;
     predicting, based on the sequence of key events in the key event queue, a total number of key events for processing in a current processing cycle of a component of the software application that is associated with the user interface to be a sum of (a) one or more key events in a list of key events currently stored in the key event queue and received before the current processing cycle and (b) an estimated number of key events to be received in a future time window;
     processing, by the component, an aggregated key event indicating multiple keypresses for the current processing cycle determined based on the predicted total number of key events; and
     updating, by the component, the user interface of the software application based on processing the aggregated key event.

9. The system of claim 8, wherein the operations further comprise:
   storing a second sequence of key events received from the input device through a second user interface of the software application in a second key event queue;
   predicting, based on the second sequence of key events in the second key event queue, a second total number of key events for processing in a second current processing cycle of a second component of the software application that is associated with the second user interface;
   processing, by the second component, a second aggregated key event indicating multiple keypresses for the second current processing cycle of the second component, a number of the multiple keypresses determined based on the predicted second total number of key events; and
   updating, by the second component, the second user interface of the software application based on processing the second aggregated key event.

10. The system of claim 8, wherein predicting the total number of key events further comprises:
    accessing the key event queue to retrieve the list of key events;
    estimating the future time window based on the list of key events; and
    determining the estimated number of key events to be received in the future time window.

11. The system of claim 10, wherein estimating the future time window based on the list of key events comprises:
    identifying a mode list of key events by selecting one or more key events from the list of key events using a Weibull distribution;
    determining a latest key event in the mode list;
    determining a future time point based on a time of the latest key event and the Weibull distribution; and
    estimating the future time window as a time window from a current time to the future time point.

12. The system of claim 11, wherein the operations further comprise:
    determining a past time window to be from an oldest key event in the list of key events to the current time;
    determining that a sum of a duration of the past time window and a time difference between the current time to the future time point is larger than a duration of the current processing cycle;
    updating the mode list of key events by removing the latest key event from the mode list of key events;
    determining the latest key event in the updated mode list;
    determining the future time point based on the time of the latest key event and the Weibull distribution; and
    estimating the future time window as a time window from a current time to the future time point.

13. The system of claim 11, wherein determining the estimated number of key events to be received in the future time window comprises calculating the number of key events by summing a plurality of values determined using the Weibull distribution and a set of weights for the key events in the mode list.

14. The system of claim 13, wherein the Weibull distribution has a shape parameter between 1.25 and 4 and a scale parameter between 1 and 4.

15. A non-transitory computer-readable medium having program code that is stored thereon, the program code executable by one or more processing devices for performing operations comprising:

storing, by a software application, in a key event queue, a sequence of key events received from an input device through a user interface of the software application executing on the one or more processing device;

predicting, based on the sequence of key events in the key event queue, a total number of key events for processing in a current processing cycle of a component of the software application that is associated with the user interface to be a sum of (a) one or more key events in a list of key events currently stored in the key event queue and received before the current processing cycle and (b) an estimated number of key events to be received in a future time window; and     triggering the component that is associated with the user interface to process an aggregated key event indicating multiple keypresses for the current processing cycle of the component and to update the user interface based on processing the aggregated key event, the multiple keypresses determined based on the predicted total number of key events.

16. The non-transitory computer-readable medium of claim 15, wherein predicting the total number of key events further comprises:

accessing the key event queue to retrieve the list of key events;

estimating the future time window based on the list of key events; and     determining the estimated number of key events to be received in the future time window.

17. The non-transitory computer-readable medium of claim 16, wherein estimating the future time window based on the list of key events comprises:

identifying a mode list of key events by selecting one or more key events from the list of key events using a Weibull distribution;

determining a latest key event in the mode list;

determining a future time point based on a time of the latest key event and the Weibull distribution; and     estimating the future time window as a time window from a current time to the future time point.

18. The non-transitory computer-readable medium of claim 17, wherein the operations further comprise:

determining a past time window to be from an oldest key event in the list of key events to the current time;

determining that a sum of a duration of the past time window and a time difference between the current time to the future time point is larger than a duration of the current processing cycle;

updating the mode list of key events by removing the latest key event from the mode list of key events;

determining the latest key event in the updated mode list;

determining the future time point based on the time of the latest key event and the Weibull distribution; and     estimating the future time window as a time window from a current time to the future time point.

19. The non-transitory computer-readable medium of claim 17, wherein determining the estimated number of key events to be received in the future time window comprises calculating the number of key events by summing a plurality of values determined using the Weibull distribution and a set of weights for the key events in the mode list.

20. The non-transitory computer-readable medium of claim 19, wherein the Weibull distribution has a shape parameter between 1.25 and 4 and a scale parameter between 1 and 4.

\* \* \* \* \*